G. E. TILLER.
TIRE MOLD.
APPLICATION FILED FEB. 18, 1919.
1,365,294.
Patented Jan. 11, 1921.
2 SHEETS—SHEET 1.
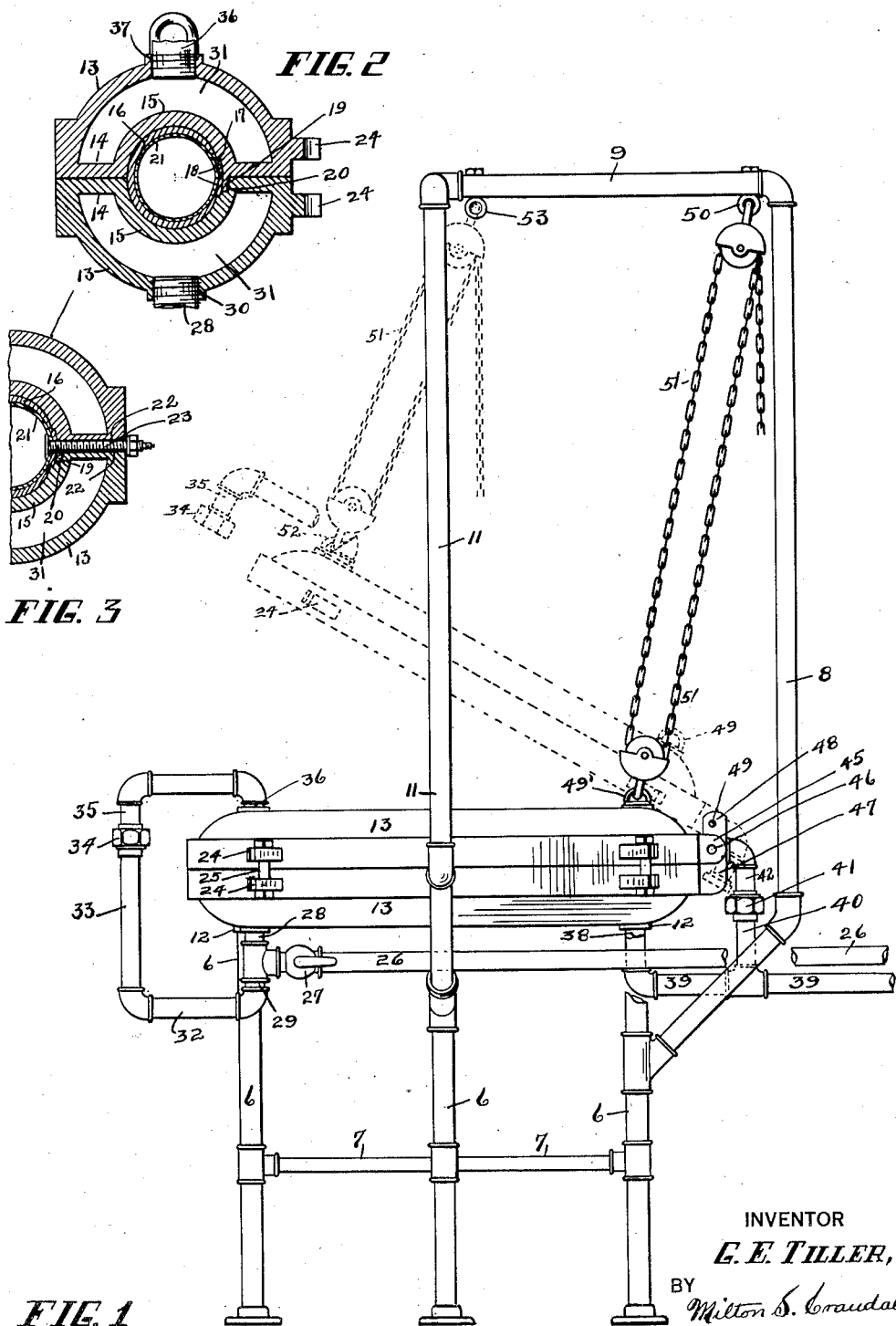
INVENTOR
G. E. TILLER,
BY
Milton S. Crandall,
ATTORNEY

G. E. TILLER.
TIRE MOLD.
APPLICATION FILED FEB. 18, 1919.

1,365,294.

Patented Jan. 11, 1921.
2 SHEETS—SHEET 2.

INVENTOR
G. E. TILLER,
BY
Milton S. Crandall
ATTORNEY

UNITED STATES PATENT OFFICE.

GEORGE E. TILLER, OF SIOUX CITY, IOWA.

TIRE-MOLD.

1,365,294.   Specification of Letters Patent.   Patented Jan. 11, 1921.

Application filed February 18, 1919. Serial No. 277,792.

*To all whom it may concern:*

Be it known that I, GEORGE E. TILLER, a citizen of the United States, and a resident of Sioux City, in the county of Woodbury and State of Iowa, have invented certain new and useful Improvements in Tire-Molds, of which the following is a specification.

This invention has for its primary object the production of an improved means of vulcanizing pneumatic tire casings.

A further object of the invention is the production of a tire mold to facilitate the so-called dry heat process of vulcanizing pneumatic tire casings and embodying certain novel features of construction and arrangement of parts whereby the casing is subjected to a uniform pressure and uniform temperature throughout the process.

Furthermore, the invention contemplates a tire mold embodying separable mold parts and improved appurtenances whereby the parts are readily placed in and out of operative positions.

Still another object of the invention is the production of an improved tire mold thoroughly efficient in operation, yet simple and comparatively inexpensive in production.

With these and other objects in view the invention consists in the construction, combination and novel arrangement of parts as will be fully understood from the following description, reference being made to the accompanying drawings, which form a part of this application, and in which like characters of reference indicate corresponding parts throughout the several views, of which:

Figure 1 is a side elevation of the device constructed in accordance with the invention, parts being cut away;

Fig. 2 is an enlarged transverse section of the mold taken on the line 2—2 of Fig. 4;

Fig. 3 is a similar view taken on the line 3—3 of Fig. 4;

Although I have illustrated and hereinafter describe the preferred embodiment of the invention, I would not be understood as being limited to the specific structure chosen for illustration, for various alterations and modifications may be made in the details of construction and arrangement of parts disclosed, without departing from the spirit and scope of the invention as defined in the appended claims.

Figure 5:
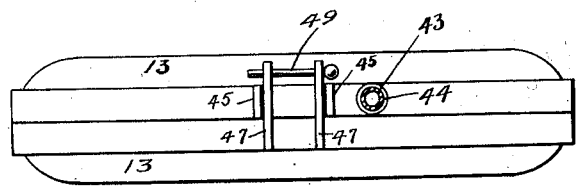
Fig. 5 is a rear elevation of the mold.
Figure 6:
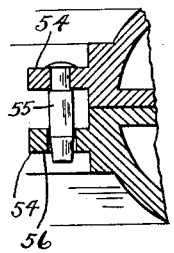
Fig. 6 is a fragmentary transverse section of the same taken on the line 6—6 of Fig. 4.
Figure 4:
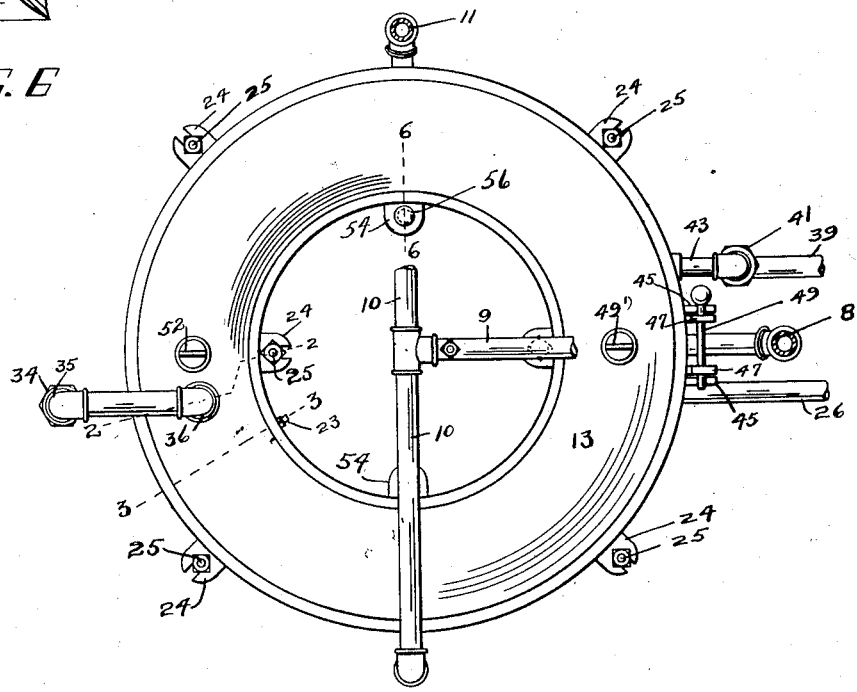
Fig. 4 is a plan of the device, parts being cut away.

Referring now to the illustration the device consists of a suitable supporting frame, preferably including supporting legs, 6, interconnected by cross members, 7. From the rear leg rises an upright, 8, the upper end of which is connected by a horizontal member, 9, with cross member, 10, (Fig. 4), the ends of which are carried by side uprights, 11, supported by the side legs, 6. Iron pipe, as illustrated, serves as a sturdy and inexpensive material for the said superstructure. The mold consists of a circular inclosure adapted to receive the usual tire casing and is divided transversely of its axis in duplicate abutting halves; the lower half being formed with bosses, 12, threaded and suitably spaced to receive the legs, 6, whereby the lower half is permanently fixed. Referring now more particularly to Fig. 2, the molds each present a semi-circular contour and include outer walls, 13, and inner walls, 14, the intermediate portions of which are concavo-convex as at 15, the said portions, 15, being so shaped and related as to form a snug inclosure for the tire casing, 16, with which the device is to be employed. At one side the interior of the portions, 15, are suitably offset as at 17, to conform to the usual tire bead, 18, and at one side of the interior of the portion, 15, of the upper half depends an annular rim, 19, adapted to enter an annular groove, 20, in the lower half. The said rim, 20, it will be observed covers the point of meeting of the tire beads.

To hold the casing yieldably against depression I insert within the casing the usual inner tube, 21, which it is clear when inflated adapts the exterior of the casing to the slight irregularities which may exist in the mold walls, 15. As shown in Fig. 3 the walls, 14, of the respective halves, are provided with registering notches, 22, to fit snugly around the usual valve tube, 23, of the inner tube, permitting the valve tube to protrude from the inner side of the mold whereby the inner tube may be inflated and the air pressure determined at intervals during the progress of the vulcanizing process.

At intervals around the inner and outer peripheries of the mold halves are lugs, 24, the lugs of each half being in registration with the corresponding lugs of the other half and adapted to receive bolts, 25, whereby the mold parts may be firmly clamped each to the other; 26 represents a pipe leading from a source of steam or other suitable hot fluid pressure; provided with a controlling valve, 27, and with laterals, 28 and 29, the former of which is threaded into an opening, 30, in the front underside of the lower mold half, whereby the hot fluid enters the chamber, 31, of the lower mold half; and the lateral, 29, depends a distance from the supply pipe, 26, and is connected with a forwardly-extending pipe, 32, having a riser, 33, connected by a union 34, with a pipe, 35, suitably connected with a pipe, 36, threaded into an opening, 37, in the wall, 13, of the upper half, substantially directly above the opening, 30, of the lower half, whereby steam is introduced into the chamber, 31, of the upper half. Approximately diametrically opposite the opening, 31, the lower half is provided with a similar opening into which is threaded a pipe, 38, suitably connected with a return or drain pipe, 39, provided with a riser, 40, connected by a union, 41, with a pipe, 42, communicating with a pipe, 43, threaded into an opening, 44, in the rear of the wall, 13, of the upper half. By virtue of this construction, it is clear that fluid flows uniformly through the chambers, 31, and thereby insures a uniform cure to the tire casings.

The rear side of the upper mold half is provided with bearing ears, 45, having openings, 46, and the corresponding side of the lower half is provided with upright bearing ears, 47, having openings, 48, to receive a rod, 49; the said openings 47 and 48, being so related that they may be placed in registration and the rod, 49, inserted therethrough, when the rear of the upper half is raised sufficiently; and to facilitate such raising of the upper half I provide on the top wall at the rear of the upper half an engageable member as the eye, 49', between which and an eye, 50, at the rear of the frame member, 9, may be interposed blocks and tackle, as shown at 51. Obviously before such separation of the mold halves the bolts, 25, must be removed from their lugs and the pipe unions, 34 and 41, must be uncoupled. The pivot rod, 49, having been introduced into the bearings, 45 and 47, the lower block of the set of blocks and tackle may be engaged with an eye, 52, or other suitable engageable member at the front of the upper half, and if desired the upper block may be engaged, as shown in dotted lines in Fig. 1 with an eye, 53, adjacent the front end of the frame member, 9. Through the medium of the blocks and tackle the upper half may then be swung upwardly on the pivot rod, as shown by dotted lines in Fig. 1, in which position the operator can very conveniently introduce or remove the tire casing.

On opposite inner sides of the mold halves I provide lugs, 54, the said lugs of one half being provided with vertical guide pins, 55, having tapered ends which enter openings, 56, in the said lugs of the other half. The said guide pins serve to properly position the upper half as it is lowered to operative position.

Having thus described my invention, what I claim as new and desire to secure by Letters Patent of the United States, is:

1. A tire vulcanizing device, including a suitable support, a tire mold disposed horizontally thereupon and divided transversely in abutting parts, the lower part being secured to the support, an arched frame on the support and above the mold, the mold parts being hinged together, and a contractile part operable to lift the latter part.

2. A tire vulcanizing mold, including a tire inclosure divided transversely of its axis in abutting parts one separable from the other, hinge members on corresponding sides of the respective parts, the said hinge members being relatively so positioned as to be placed in coöperative relation when the adjacent sides of the parts are separated a distance, whereby the parts may be swung relatively one from the other.

3. A tire vulcanizing device including a suitable support, a tire mold including a horizontal tire inclosure divided transversely of its axis in abutting parts, the lower of said parts being fixed on the support, hinge members on corresponding sides of the parts, said hinge members being relatively so positioned as to be placed in coöperative relation when the adjacent side of the upper part is lifted a distance whereby the opposite side of the upper half may be lifted, a supporting means above the mold, mechanism thereon operable to lift the upper half, annular chambers in said parts, a heated fluid-pressure-conductor communicating with the chamber of the lower part and detachably communicating with the chamber of the upper part, and eduction passages from the chambers.

In testimony whereof, I have hereunto set my hand this 15th day of February, 1919.

GEORGE E. TILLER.